No. 797,253. PATENTED AUG. 15, 1905.
A. W. BANISTER.
SWITCH GATE FOR CONDUITS.
APPLICATION FILED MAR. 13, 1905.
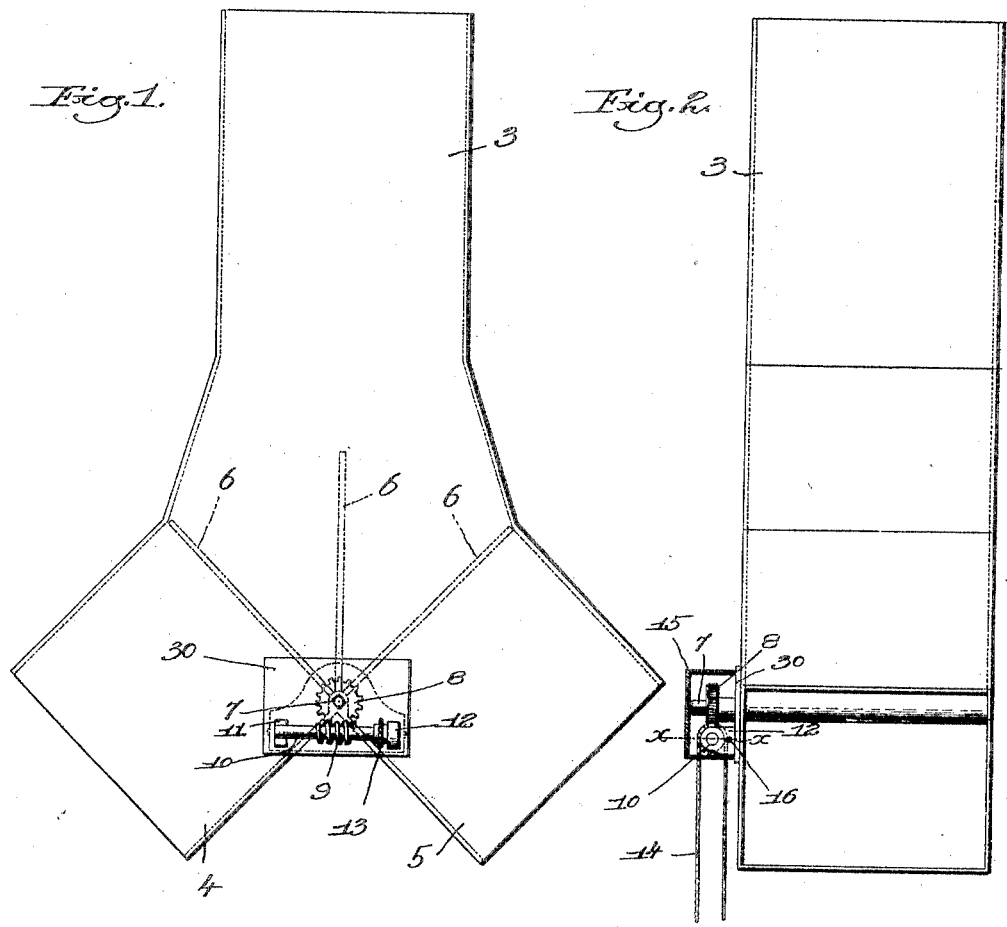
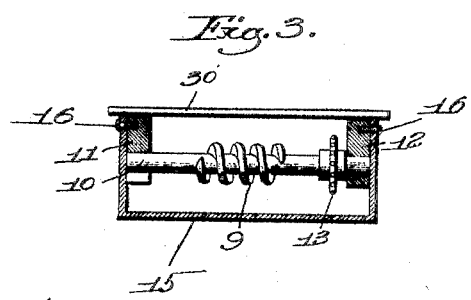

UNITED STATES PATENT OFFICE.

ARTHUR W. BANISTER, OF BOSTON, MASSACHUSETTS.

SWITCH-GATE FOR CONDUITS.

No. 797,253.        Specification of Letters Patent.        Patented Aug. 15, 1905.

Application filed March 13, 1905. Serial No. 249,971.

*To all whom it may concern:*

Be it known that I, ARTHUR W. BANISTER, a citizen of the United States, residing at Boston, in the county of Suffolk and State of Massachusetts, have invented an Improvement in Switch-Gates for Conduits, of which the following description, in connection with the accompanying drawings, is a specification, like figures on the drawings representing like parts.

In making conduits, especially those used in pneumatic conveying systems, it is customary to employ a switch-gate at the points where the conduit opens into or connects with branch conduits, said switch-gate being constructed to direct the material in the conduit into one or the other of the branches or to divide the material and direct a portion into each branch. As commonly constructed these switch-gates are operated by an arm or arms fast on the pivotal shaft of the gate, and connected to the arms are chains or pull devices by means of which the gate may be swung into its various positions. With this construction it is customary to attach the chains to hooks, nails, or other similar devices in order to lock the gate in any intermediate position, for unless the gate is thus locked it will automatically assume either one or the other of its two extreme positions. I have improved this ordinary type of switch-gate by providing one which is self-locking, so that it will be automatically held in any intermediate position without the use of special locking devices.

In accordance with my invention I apply to a shaft of a switch-gate a worm-gear which meshes with a worm mounted in a casing exterior to the conduit, said worm having rigid therewith a sprocket-wheel over which an operating sprocket-chain passes. The worm-and-gear construction makes the switch a self-locking one, as the worm locks the switch-gate against movement in any position of the latter.

Referring to the drawings, Figure 1 is a side view of a section of a conduit having branches leading therefrom and having my improved switch-gate applied thereto, said view showing the casing removed. Fig. 2 is a side view of Fig. 1, showing the casing in place and in section. Fig. 3 is a section on the line $x\ x$, Fig. 2.

3 designates a section of a conduit which is herein shown as leading into two branches 4 and 5, which branches may lead to different locations. Pivoted at the crotch of the branches is a switch-gate 6, said gate adapted to close either branch, as shown in dotted lines, Fig. 1. Said gate is mounted on a pivotal shaft 7, carried by suitable bearings at the crotch of the branches. Said shaft extends beyond the side of the conduit and has fast thereon a worm-gear 8, which meshes with a worm 9 on a worm-shaft 10. Said shaft 10 is journaled in suitable bearings 11 and 12, carried by a plate 30, fast to the side of the conduit, the bearing 11 preferably being slotted, so as to facilitate the removal of the worm-shaft. Fast to the worm-shaft is a sprocket-wheel 13, with which coöperates an operating sprocket-chain 14, by means of which chain the gate 6 may be swung into any desired position. Inclosing the gearing above referred to is a casing 15, which is detachably secured to the conduit in any suitable way—as, for instance, by means of a securing-screw 16, which passes through the side of the casing and into the bearing 11. When the casing is in position, the shaft 10 abuts against the end walls thereof, and said walls of the casing therefore serve to hold the worm-shaft from longitudinal movement. The switch-gate 6 can be readily adjusted into any position by means of the operating-chain 14, and when in any position it is locked automatically by reason of the worm-and-gear construction. It will be noted that the casing 15 can be very readily removed, and as said casing holds the worm-shaft 10 in position removal of the casing permits the ready removal of said shaft.

Various changes in the construction of the device may be made without departing from the invention.

Having described my invention, what I claim as new, and desire to secure by Letters Patent, is—

1. In a device of the class described, a conduit having branches, a pivoted switch-gate to control said branches, a worm-gear rigid with the gate, a worm-shaft meshing with said gear, a sprocket-wheel on the worm-shaft, a sprocket-chain engaging the sprocket-wheel and passing through the casing and a casing inclosing said gears, the ends of the worm-shaft engaging the opposite walls of the casing.

2. A conduit provided with branches, a switch-gate pivotally mounted at the crotch of the branches, a worm-gear rigid with the gate and exterior to the conduit, a worm-shaft having a worm thereon engaging the worm-gear and a casing inclosing said gears, the ends of the shaft engaging the opposite walls of the casing whereby said casing holds the shaft in position.

In testimony whereof I have signed my name to this specification in the presence of two subscribing witnesses.

ARTHUR W. BANISTER.

Witnesses:
   LOUIS C. SMITH,
   MARGARET A. DUNN.